(12) United States Patent
Ikic et al.

(10) Patent No.: US 12,528,459 B2
(45) Date of Patent: Jan. 20, 2026

(54) SYSTEM AND METHOD FOR MONITORING SURROUNDINGS OF A VEHICLE

(71) Applicant: Deere & Company, Moline, IL (US)

(72) Inventors: Davorin Ikic, Stuttgart (DE); Nico Schleweis, Donnbronn (DE); Florian Reinmuth, Sinsheim (DE); Rocio Galvez Castillo, Schwäbisch Hall (DE); Roman Walther, Ludwigsburg (DE); Stephanie Kauker, Hemmingen (DE)

(73) Assignee: Deere & Company, Moline, IL (US)

( * ) Notice: Subject to any disclaimer, the term of this patent is extended or adjusted under 35 U.S.C. 154(b) by 402 days.

(21) Appl. No.: 17/080,024

(22) Filed: Oct. 26, 2020

(65) Prior Publication Data

US 2021/0122368 A1 Apr. 29, 2021

(30) Foreign Application Priority Data

Oct. 29, 2019 (DE) .......................... 102019216598.2

(51) Int. Cl.
*B60W 30/095* (2012.01)
*B60W 30/14* (2006.01)
(Continued)

(52) U.S. Cl.
CPC .......... *B60W 30/095* (2013.01); *B60W 30/14* (2013.01); *B60W 50/14* (2013.01);
(Continued)

(58) Field of Classification Search
CPC ............... B60W 30/095; B60W 30/14; B60W 30/0956; B60W 30/0953; B60W 50/14;
(Continued)

(56) References Cited

U.S. PATENT DOCUMENTS 5,457,439 A * 10/1995 Kuhn ..................... B60K 35/22
340/479
2014/0278059 A1 * 9/2014 Gunther ............. G01C 21/3697
701/414
(Continued)

FOREIGN PATENT DOCUMENTS

DE 102009057978 A1 * 6/2011 ........ B60W 30/0956
DE 10 2011113 722 A1 5/2012
(Continued)

OTHER PUBLICATIONS

Stephan Zecha. Position/motion prediction device, 2011 (Year: 2011).*

(Continued)

*Primary Examiner* — Abby J Flynn
*Assistant Examiner* — Bakari Underwood

(57) ABSTRACT

The present invention provides a method for monitoring the surroundings of a vehicle (F) comprising sensing (S1) an object (O) in the surroundings of the vehicle (F) by means of at least one sensor device (S); determining (S2) a probability of a collision of the vehicle (F) with the object (O) by means of an evaluation device on the basis of sensor data of the sensor device (S), wherein at least one movement parameter (BP-F) of the vehicle (F), at least one vehicle parameter (FP) and at least one movement parameter (BP-O) of the object (O) are taken into account; and displaying (S3) a recommendation for the vehicle (F) to drive on or to stop in accordance with the determined probability of a collision on a display device (D).

17 Claims, 2 Drawing Sheets

(51) Int. Cl.
  *B60W 50/14* (2020.01)
  *G06V 20/56* (2022.01)
(52) U.S. Cl.
  CPC ....... *G06V 20/56* (2022.01); *B60W 2050/143* (2013.01); *B60W 2420/403* (2013.01); *B60W 2510/18* (2013.01)
(58) Field of Classification Search
  CPC ..... B60W 2050/143; B60W 2420/403; B60W 2510/18; G06V 20/56
  See application file for complete search history.

(56) References Cited

U.S. PATENT DOCUMENTS

| | | | |
|---|---|---|---|
| 2015/0183431 A1* | 7/2015 | Nanami | B60W 30/095 |
| | | | 701/301 |
| 2016/0138249 A1* | 5/2016 | Conway | G06T 11/00 |
| | | | 701/50 |
| 2018/0170369 A1* | 6/2018 | Mitchell | B62D 1/02 |
| 2019/0031206 A1* | 1/2019 | Lang | B60W 30/0956 |
| 2019/0039624 A1* | 2/2019 | Ike | B60W 50/14 |
| 2019/0337509 A1* | 11/2019 | Shalev-Shwartz | |
| | | | B60W 50/087 |
| 2021/0018617 A1* | 1/2021 | Iwase | G01S 15/62 |
| 2021/0123728 A1* | 4/2021 | Smith | A01B 15/16 |
| 2022/0198809 A1* | 6/2022 | Oami | G08G 1/16 |

FOREIGN PATENT DOCUMENTS

| | | |
|---|---|---|
| DE | 10 2012 009 297 A1 | 12/2012 |
| DE | 10 2011 121 763 A1 | 6/2013 |
| DE | 112012000466 B4 | 12/2018 |
| KR | 20200110518 A * | 9/2020 |

OTHER PUBLICATIONS

Advanced driver assistance system and implementation method for the aftermarket, which wirelessly adjusts, maintains, and manages all functions and device settings by installing multi-channel two-way wireless data communication module (Year: 2020).*

German Search Report issued in application No. DE102019216598. 2, dated Apr. 9, 2020, 5 pages.

* cited by examiner

SYSTEM AND METHOD FOR MONITORING SURROUNDINGS OF A VEHICLE

PRIORITY CLAIM

This application claims priority to German Application No. DE 102019216598.2 filed on Oct. 29, 2019. The entire contents of the above-mentioned patent application are incorporated herein by reference as part of the disclosure of this U.S. application.

The present invention relates to a method for monitoring the surroundings of a vehicle and to a system for monitoring the surroundings of a vehicle.

PRIOR ART

In driving assistance systems, sensors are used for actively monitoring the surroundings and the traffic situation. Agricultural machines or construction machines can be supported by means of a plurality of different sensors for handling them, in particular with large trailers, in road traffic. A wide variety of assistance systems for detecting static and also movable objects, for example objects in a blind spot or an adaptive cruise controller, are known from the field of passenger cars. Acoustic or visual warnings to the driver are usually generated. In this context, parameters such as an expected time to collision (ttc), for example when neither the vehicle nor the oncoming vehicle or the object have previously been influenced in their travel trajectory, a vehicle speed, a position, and a distance of the object or of the vehicle, can be determined. Usual assistance systems use purely imaging methods (for example SATCON transverse-mounted camera monitor system).

DE 11 2012 000 466 B4 describes a system and a method for maneuvering a vehicle trailer combination.

SUMMARY OF THE INVENTION

The present invention provides a method for monitoring the surroundings of a vehicle as claimed in claim 1 and a system for monitoring the surroundings of a vehicle as claimed in claim 12.

Preferred developments are the subject matter of the dependent claims.

Advantages of the Invention

The concept underlying the present invention consists in specifying a method and a system for monitoring the surroundings of a vehicle, which can assist the driver in traffic situations and can facilitate handling of the vehicle in traffic.

According to the invention, in the method for monitoring the surroundings of a vehicle an object is sensed in the surroundings of the vehicle by means of at least one sensor device; a probability of a collision of the vehicle with the object is determined by means of an evaluation device on the basis of sensor data of the sensor device, wherein at least one movement parameter of the vehicle, at least one vehicle parameter and at least one movement parameter of the object are taken into account; and a recommendation for the vehicle to drive on or to stop is displayed in accordance with the determined probability of a collision on a display device.

The object can be a wide variety of objects in road traffic or in country areas, for example persons, buildings, vehicles, animals or the like. The vehicle can advantageously be an agricultural machine, for example a tractor. The vehicle can also have one or more trailers. The probability of a collision can be advantageously displayed to a driver in order to reduce the risk of collisions, advantageously at crossroad areas, entry and exit areas and/or yard areas with poor visibility. In the case of areas with poor visibility the driver can be assisted in his decision if it is possible to make a turn or drive in or out of an entry or if doing so can be associated with the lowest possible risk for other road users. The sensor device can be arranged here at least to the right and left of the forward direction of travel of the vehicle, advantageously on a front section, for example for agricultural machine attachments.

The driver can therefore experience assistance in viewing the crossroad area or turning off area, which can permit improved assessment of the traffic situation in particular under bad weather conditions and when there is reduced all-round visibility or when there is spray or strong sunlight. It is therefore also possible to recognize better objects or vehicles with a high relative speed with respect to the vehicle and compact dimensions and to assess their movement profile, for example motorcycles.

The sensor device can advantageously comprise radar and/or one or more cameras and be arranged as an integrated system on a front structure of the vehicle. Furthermore, the sensor device can also comprise other sensor technologies, for example Lidar or imaging cameras.

The display device can be combined with a plurality of sensor devices. In this way, a combination of a plurality of displays can be arranged in the driver's cab, for example a display on each side when viewed from the driver's position.

It is therefore possible, for example, to arrange radar on the left side and a camera on the left side, when viewed in the direction of travel, on a front structure, and to connect them to a display on the left side, and advantageously to display only the traffic situation on the left side.

Furthermore, radar on the right side and a camera on the right side when viewed in the direction of travel can be arranged on a front section and connected to a display on the right side, and advantageously only display the traffic situation on the right side.

The displays can be connected to one another via a bus system, and the cameras and displays can likewise be connected by means of an Ethernet/LVDS, and the radar sensors (cameras) can be connected to the display by means of an (automotive) CAN and to a Gateway/IMU via a bus, for example an ISOBUS, wherein the Gateway can be connected to the displays with an ISOBUS (EE architecture).

According to one preferred embodiment of the method, the movement parameter of the vehicle comprises a roadway trajectory and/or an acceleration of the vehicle and/or a velocity of the vehicle and/or an achievable braking force of the vehicle.

The future travel path or movement path of the vehicle can be advantageously determined better by a wide variety of movement parameters. The acceleration of the vehicle can also correspond to a capability for acceleration and to the question about an acceleration command which has taken place.

According to one preferred embodiment of the method, the vehicle parameter comprises a vehicle mass and/or a vehicle length and/or a vehicle width and/or a turning circle and/or a vehicle weight.

The future travel path or movement path of the vehicle or object can advantageously be determined better by a wide variety of vehicle parameters.

According to one preferred embodiment of the method, the movement parameter of the object comprises an object size and/or a movement speed of the object.

The future travel path or movement path of the object can advantageously be determined better by means of a wide variety of movement parameters.

According to one preferred embodiment of the method, a time to collision relative to a position of the vehicle and the position of the vehicle are determined.

By means of the sensor information it is advantageously possible to calculate a potential braking time and in addition a reaction time of the driver, of the vehicle and/or of the object can be taken into account and the possibility of emergency braking determined in order to avoid a collision. In this context, it is always possible to determine a fictional time to collision which continues to display the time up to a collision if the instantaneous travel conditions and/or movement conditions of the vehicle and/or object are maintained. Possible reaction scenarios can then be assessed starting from this time, advantageously on the basis of the effect of said scenarios on the movement of the vehicle.

According to one preferred embodiment of the method, the probability of a collision is determined on the basis of the time to collision, and if the time to collision is longer than a sum of the braking time of the vehicle to a stationary state and a reaction time of a driver and a safety time period, the probability of a collision is displayed as low.

The braking time of the vehicle can advantageously be a braking time to a stationary state of the vehicle.

The safety time period can be, for example, 2 seconds, wherein other values between 1 s and 4 s are also possible. A reaction time of the driver can be between 0.5 s and 3 s. The display of the probability of a collision as improbable can be effected, for example, also with the display of a color, for example by means of a colored light in the passenger compartment of the vehicle or in a display device. An improbable probability of a collision can preferably be displayed with a green color. The determined braking time can advantageously be the actually required computational braking time which may be necessary up to the stationary state and with the deceleration, which can be performed by the brake system, in the specific traffic situation.

According to one preferred embodiment of the method, the probability of a collision is determined on the basis of the time to collision, and if the time to collision together with a safety time period is determined as being longer than a sum of a braking time of the vehicle and a reaction time of the driver, the probability of a collision is displayed as average.

An average probability of a collision can preferably be displayed with an orange color. The safety time period can advantageously vary depending on the speed of the object, and can, for example, be shorter for relatively fast objects.

According to one preferred embodiment of the method, the probability of a collision is determined on the basis of the time to collision, and if the time to collision is determined as being shorter than or equal to a sum of a braking time of the vehicle and a reaction time of the driver, the probability of a collision is displayed as high.

A high probability of a collision can preferably be displayed with a red color and signal to the driver that the driver should preferably not drive into the collision area.

According to one preferred embodiment of the method, the safety time period depends on a speed of the object, and the probability of a collision is displayed on the display device in color.

According to one preferred embodiment of the method, the probability of a collision is displayed on the display device and a visual camera image of the surroundings is superimposed thereon.

A collision value together with the respective color of the probability of a collision can also advantageously be displayed on the display device. For example, the collision value can vary on a scale between 1 and 10, wherein the green area can be displayed between 1 and 3, the orange area between 4 and 6 and the red area between 7 and 10. An improved impression of the traffic situation can be produced by a superimposed image. The object and its movement can be displayed on the display by means of an arrow display.

According to one preferred embodiment of the method, the probability of a collision is determined in accordance with a travel trajectory of the vehicle and a movement trajectory of the object, and when an intersection point of the travel trajectory with the movement trajectory is determined or when the flashing indicator lights of the vehicle are activated in a direction toward the object the probability of a collision is displayed as high, or when there is an overtaking process of the vehicle by the object the probability of a collision is displayed as average.

In this context, a two-level warning procedure can be used, wherein in a first danger level the object behind the vehicle can move out and overtake the vehicle. This first level can cause an orange area to be displayed.

In a second danger level, the travel trajectory and the movement trajectory can intersect at least at one point in the foreseeable future, as a result of which a red area can be displayed.

The colored displays can be mounted as a traffic light, for example in or on the outside of the driver's cab next to the exterior rear view mirrors and at their level, preferably one of these traffic lights can be mounted on each side of each side mirror. In addition, a corresponding acoustic warning signal can also be output, said warning signal being respectively different for the green, orange and red areas.

According to the invention, the system for monitoring the surroundings of a vehicle comprises a sensor device which is mounted on the vehicle and is configured to sense an object in the surroundings of the vehicle; an evaluation device which is configured to determine a probability of a collision of the vehicle with the object on the basis of sensor data from the sensor device, wherein at least one movement parameter of the vehicle, at least one vehicle parameter and at least one movement parameter of the object can be taken into account; and a display device which is configured to display a recommendation for the vehicle to drive on or to stop in accordance with the determined probability of a collision.

According to one preferred embodiment of the system, the sensor device is arranged on a front section which is mounted at an end of the vehicle which is at the front in the direction of travel.

Furthermore, it is possible that in addition to or as an alternative to the arrangement on the front section the sensor device can also or only be mounted on the rear section of the vehicle and/or on a rear-mounted implement and/or on a trailer.

The system can also be distinguished by the features specified in conjunction with the method, and the advantages thereof, and vice versa.

Further features and advantages of embodiments of the invention emerge from the following description with reference to the appended drawings.

BRIEF DESCRIPTION OF THE DRAWINGS

The present invention will be described in more detail below on the basis of the exemplary embodiments specified in the schematic figures of the drawing, of which.

In the figures, identical reference symbols denote identical or functionally identical elements.

DETAILED DESCRIPTION

Figure 1:
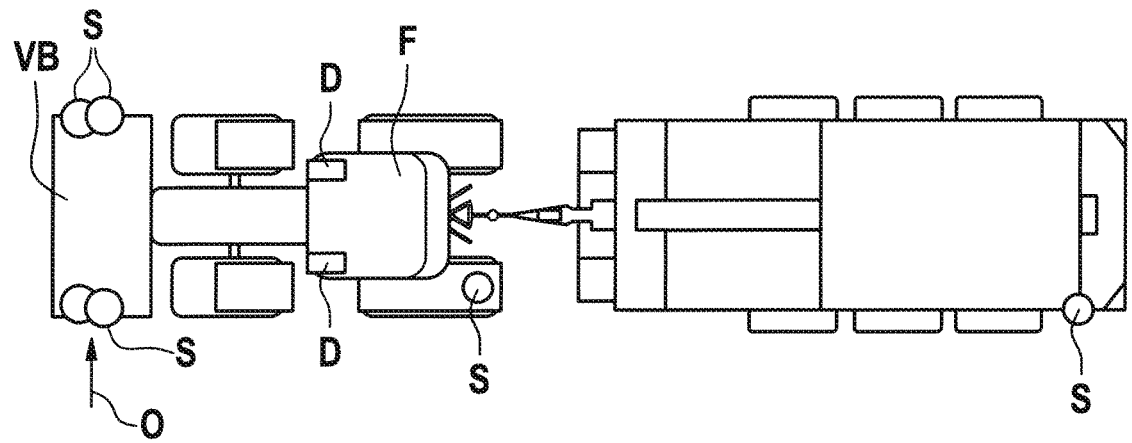
FIG. 1 shows a schematic view of a vehicle having a trailer with a system for monitoring the surroundings of the vehicle according to an exemplary embodiment of the present invention.

FIG. 1 shows a schematic view of a vehicle having a trailer with a system for monitoring the surroundings of the vehicle according to an exemplary embodiment of the present invention.

The vehicle F advantageously comprises a system 1 for monitoring the surroundings of the vehicle F comprising a sensor device S which is mounted on the vehicle F and is configured to sense an object O in the surroundings of the vehicle F; an evaluation device which is configured to determine a probability of a collision of the vehicle F with the object O on the basis of sensor data from the sensor device S, wherein at least one movement parameter of the vehicle F, at least one vehicle parameter and at least one movement parameter of the object O can be taken into account; and a display device D which is configured to display a recommendation for the vehicle F to drive on or to stop in accordance with the determined probability of a collision. The sensor device S can be arranged here on a front section VB which can be mounted at an end of the vehicle F which is at the front in the direction of travel. Furthermore, it is possible that in addition to or as an alternative to the arrangement on the front section the sensor device S can also or only be mounted on the rear section of the vehicle and/or on a rear-mounted implement and/or on a trailer.

An object O can approach from a right-hand side or left-hand side (arrow display) and be sensed by the sensor device.

Figure 2:
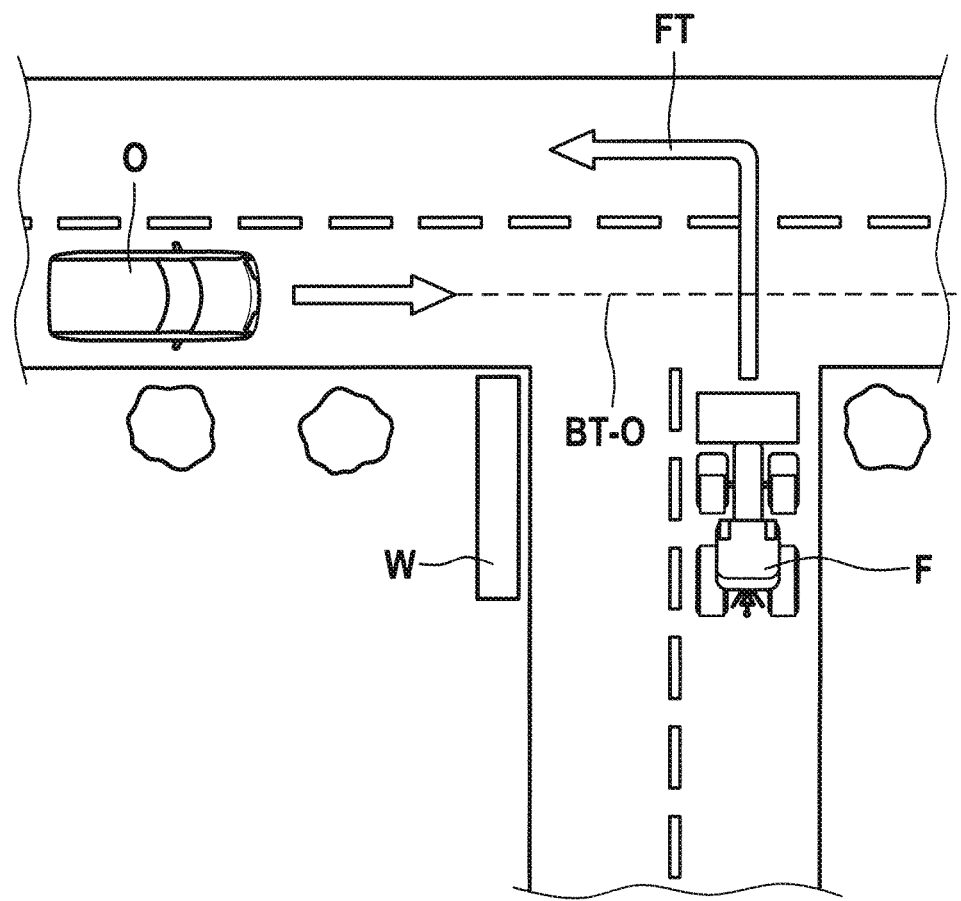
FIG. 2 shows a traffic situation for the application of the system according to the invention for monitoring the surroundings of the vehicle.

FIG. 2 shows a traffic situation for the application of the system according to the invention for monitoring the surroundings of the vehicle.

The vehicle F can come to a standstill at a crossroad area, and for a turn to the left the system can monitor the crossroad area and the risk of a collision with an object. An object O can be in this context a further vehicle whose movement trajectory BT-O can intersect the travel trajectory FT of the vehicle F in the crossroad area if the object maintains this direction of travel. This can be advantageous, in particular, if the view of the crossroad area and the further course of the road is impeded, for example by a wall W. The system can determine a possible time to collision by means of the movement and vehicle parameters, and as a result display a recommendation as to whether the turn can be made with a low or high probability of a collision.

Figure 3:
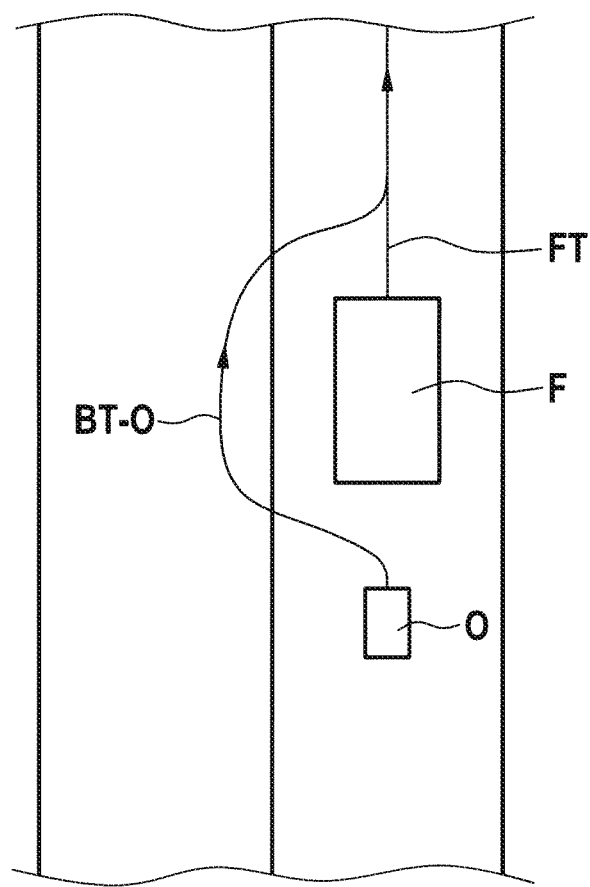
FIG. 3 shows a further traffic situation for the application of the system according to the invention and of the method according to the invention.

FIG. 3 shows a further traffic situation for the application of the system according to the invention and of the method according to the invention.

In the traffic situation in FIG. 3, an object O, for example a further vehicle, can overtake the vehicle F to the side on a roadway and cut in again before said vehicle. In this context, the method according to the invention can determine the possible probability of a collision in accordance with a travel trajectory FT of the vehicle and a movement trajectory BT-O of the object, and when an intersection point of the travel trajectory FT with the movement trajectory BT-O is determined or when the flashing indicator lights of the vehicle F are activated in a direction toward the object the probability of a collision can be displayed as high, or when there is an overtaking process of the vehicle by the object the probability of a collision can be displayed as average if an intersection point of the trajectories and activation of the flashing indicator lights of the vehicle in the direction of the object do not occur in the near future.

Figure 4:
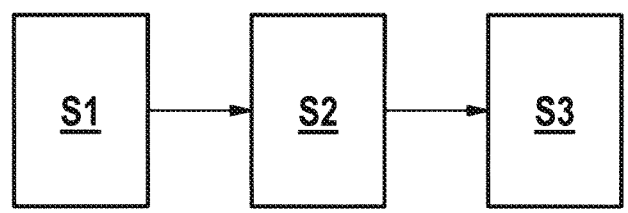
FIG. 4 shows a block illustration of method steps of the method for monitoring the surroundings of a vehicle according to an exemplary embodiment of the present invention.

FIG. 4 shows a block illustration of method steps of the method for monitoring the surroundings of a vehicle according to an exemplary embodiment of the present invention.

In the method for monitoring the surroundings of a vehicle, an object is sensed S1 in the surroundings of the vehicle by means of at least one sensor device; a probability of a collision of the vehicle with the object is determined S2 by means of an evaluation device on the basis of sensor data of the sensor device, wherein at least one movement parameter of the vehicle, at least one vehicle parameter and at least one movement parameter of the object are taken into account; and a recommendation for the vehicle to drive on or to stop is displayed S3 in accordance with the determined probability of a collision on a display device.

Although the present invention has been described completely above on the basis of the preferred exemplary embodiment, it is not limited thereto but rather can be modified in a variety of ways.

The invention claimed is:

1. A method for monitoring the surroundings of a vehicle comprising the steps:

sensing an object in the surroundings of the vehicle via a first sensor and a second sensor, the first sensor arranged on a left side of an agricultural machine attachment which is mounted at a front end of the vehicle, the first sensor positioned forward of and spaced apart from the front end of the vehicle, the second sensor arranged on a right side of the agricultural machine attachment, and the second sensor positioned forward of and spaced apart from the front end of the vehicle;

determining a possible time to collision relative to a position of the vehicle and the position of the vehicle and a probability of collision of the vehicle with the object via an evaluation device on the basis of sensor data of the first and second sensors and the possible time to collision, wherein at least one movement parameter of the vehicle, at least one vehicle parameter, and at least one movement parameter of the object are taken into account;

displaying a recommendation for the vehicle to drive on or to stop in accordance with the determined probability of collision on one of a first display device connected to the first sensor and a second display device connected to the second sensor;

displaying a traffic situation from only the left side of the agricultural machine attachment on the first display device mounted as a first traffic light outside a vehicle cab adjacent to a left exterior rear view mirror, and displaying a traffic situation from only the right side of the agricultural machine attachment on the second display device mounted as a second traffic light outside of the vehicle cab adjacent to a right exterior rear view mirror;

displaying the probability of collision as low with a green color on one of the first and second display devices when the possible time to collision is longer than a sum of a braking time of the vehicle to a stationary state, a reaction time of a driver, and a safety time period depending on a speed of the object;

displaying the probability of collision as average with an orange color on one of the first and second display devices when the possible time to collision together with a safety time period is determined as being longer than the sum of the braking time of the vehicle to the stationary state and the reaction time of the driver; and displaying the probability of collision as high with a red color on one of the first and second display devices when the possible time to collision is determined as being shorter than or equal to the sum of the braking time of the vehicle to the stationary state and the reaction time of the driver.

2. The method of claim 1, wherein the movement parameter of the vehicle comprises one or more of a roadway trajectory, an acceleration of the vehicle, a velocity of the vehicle, and an achievable braking force of the vehicle.

3. The method of claim 1, wherein the vehicle parameter comprises one or more of a vehicle mass, a vehicle length, a vehicle width, a turning circle, and a vehicle weight.

4. The method of claim 1, wherein the movement parameter of the object comprises one or more of an object size and a movement speed of the object.

5. The method of claim 1, wherein the probability of collision is displayed on one of the first and second display devices and a visual camera image of the surroundings is superimposed thereon.

6. The method of claim 1, wherein a third sensor is mounted on an implement mounted at a rear of the vehicle rearward of a rear tire of the vehicle and configured to sense an object in the surroundings of the vehicle.

7. The method of claim 1, wherein the first sensor includes one or more of a radar and a camera, and the second sensor includes one or more of a radar and a camera.

8. A system for monitoring the surroundings of a vehicle comprising:
a first sensor mounted on a left side of an agricultural machine attachment which is mounted at a front end of the vehicle, a second sensor mounted on a right side of the agricultural machine attachment, the first and second sensors configured to sense an object in the surroundings of the vehicle, the first and second sensors positioned forward of and spaced apart from the front end of the vehicle;
an evaluation device configured to determine a possible time to collision relative to a position of the vehicle and the position of the vehicle and a probability of collision of the vehicle with the object on the basis of sensor data from the first and second sensors and the possible time to collision, wherein at least one movement parameter of the vehicle, at least one vehicle parameter and at least one movement parameter of the object can be taken into account; and
a first display device connected to the first sensor and mounted as a first traffic light outside a vehicle cab adjacent to a left exterior rear view mirror, and a second display device connected to the second sensor and mounted as a second traffic light outside of the vehicle cab adjacent to a right exterior rear view mirror, the first and second display devices configured to display a recommendation for the vehicle to drive on or to stop in accordance with the determined probability of collision, the first display device configured to display a traffic situation from only the left side of the agricultural machine attachment, and the second display device configured to display a traffic situation from only the right side of the agricultural machine attachment;

the evaluation device configured to:
display the probability of collision as low with a green color on one of the first and second display devices when the possible time to collision is longer than a sum of a braking time of the vehicle to a stationary state, a reaction time of a driver, and a safety time period depending on a speed of the object;
display the probability of collision as average with an orange color on one of the first and second display devices when the possible time to collision together with a safety time period is determined as being longer than the sum of the braking time of the vehicle to the stationary state and the reaction time of the driver; and
display the probability of collision as high with a red color on one of the first and second display devices when the possible time to collision is determined as being shorter than or equal to the sum of the braking time of the vehicle to the stationary state and the reaction time of the driver.

9. The system of claim 8, wherein a third sensor is mounted on an implement mounted at a rear of the vehicle rearward of a rear tire of the vehicle and configured to sense an object in the surroundings of the vehicle.

10. The system of claim 8, wherein the first sensor includes one or more of a radar and a camera, and the second sensor includes one or more of a radar and a camera.

11. The system of claim 8, wherein the movement parameter of the vehicle comprises one or more of a roadway trajectory, an acceleration of the vehicle, a velocity of the vehicle, and an achievable braking force of the vehicle.

12. The system of claim 8, wherein the vehicle parameter comprises one or more of a vehicle mass, a vehicle length, a vehicle width, a turning circle, and a vehicle weight.

13. The system of claim 8, wherein the movement parameter of the object comprises one or more of an object size and a movement speed of the object.

14. A vehicle including a system for monitoring the surroundings, comprising:
a first sensor mounted on a left side of an agricultural machine attachment which is mounted at a front end of the vehicle, a second sensor mounted on a right side of the agricultural machine attachment, the first and second sensors configured to sense an object in the surroundings of the vehicle, the first and second sensors positioned forward of and spaced apart from the front end of the vehicle;
an evaluation device configured to determine a possible time to collision relative to a position of the vehicle and the position of the vehicle and a probability of collision of the vehicle with the object on the basis of sensor data from the first and second sensors and the possible time to collision, wherein at least one movement parameter of the vehicle, at least one vehicle parameter and at least one movement parameter of the object can be taken into account; and a first display device connected to the first sensor and mounted as a first traffic light outside a vehicle cab adjacent to a left exterior rear view mirror, and a second display device connected to the second sensor and mounted as a second traffic light outside of the vehicle cab adjacent to a right exterior rear view mirror, the first and second display devices configured to display a recommendation for the vehicle to drive on or to stop in accordance with the determined probability of collision, the first display device configured to display a traffic situation from only the left side of the agricultural machine attachment, and the second display device configured to display a traffic situation from only the right side of the agricultural machine attachment;

the evaluation device configured to:
  display the probability of collision as low with a green color on one of the first and second display devices when the possible time to collision is longer than a sum of a braking time of the vehicle to a stationary state, a reaction time of a driver, and a safety time period depending on a speed of the object;
  display the probability of collision as average with an orange color on one of the first and second display devices when the possible time to collision together with a safety time period is determined as being longer than the sum of the braking time of the vehicle to the stationary state and the reaction time of the driver; and
  display the probability of collision as high with a red color on one of the first and second display devices when the possible time to collision is determined as being shorter than or equal to the sum of the braking time of the vehicle to the stationary state and the reaction time of the driver.

15. The vehicle of claim 14, wherein the first sensor includes one or more of a radar and a camera, and the second sensor includes one or more of a radar and a camera.

16. The vehicle of claim 14, wherein the movement parameter of the vehicle comprises one or more of a roadway trajectory, an acceleration of the vehicle, a velocity of the vehicle, and an achievable braking force of the vehicle, wherein the vehicle parameter comprises one or more of a vehicle mass, a vehicle length, a vehicle width, a turning circle, and a vehicle weight, and wherein the movement parameter of the object comprises one or more of an object size and a movement speed of the object.

17. The vehicle of claim 14, wherein the vehicle is an agricultural tractor.

* * * * *